United States Patent
Konoshita et al.

(10) Patent No.: US 12,466,760 B2
(45) Date of Patent: Nov. 11, 2025

(54) OPTICAL GLASS

(71) Applicant: Nippon Electric Glass Co., Ltd., Shiga (JP)

(72) Inventors: Satoko Konoshita, Shiga (JP); Takahiro Matano, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 1010 days.

(21) Appl. No.: 17/616,759

(22) PCT Filed: Jun. 26, 2020

(86) PCT No.: PCT/JP2020/025264
§ 371 (c)(1),
(2) Date: Dec. 6, 2021

(87) PCT Pub. No.: WO2021/006072
PCT Pub. Date: Jan. 14, 2021

(65) Prior Publication Data
US 2022/0340475 A1 Oct. 27, 2022

(30) Foreign Application Priority Data
Jul. 5, 2019 (JP) .................. 2019-125826

(51) Int. Cl.
*C03C 3/068* (2006.01)
*C03C 4/08* (2006.01)
*G02B 5/20* (2006.01)

(52) U.S. Cl.
CPC ............. *C03C 3/068* (2013.01); *C03C 4/08* (2013.01); *G02B 5/204* (2013.01)

(58) Field of Classification Search
CPC ...................... C03C 3/068; C03C 4/08
See application file for complete search history.

(56) References Cited

U.S. PATENT DOCUMENTS

| 2011/0028300 | A1 | 2/2011 | Zou et al. | |
| 2013/0210604 | A1 | 8/2013 | Zou et al. | |
| 2015/0031525 | A1* | 1/2015 | Negishi | C03C 3/095 |
| | | | | 501/78 |
| 2015/0203395 | A1* | 7/2015 | Kuang | C03C 3/068 |
| | | | | 501/78 |
| 2016/0194237 | A1* | 7/2016 | Negishi | G02B 1/00 |
| | | | | 501/78 |

FOREIGN PATENT DOCUMENTS

| JP | 2009-179510 | 8/2009 |
| JP | 2012-162448 | 8/2012 |
| JP | 2012-229148 | 11/2012 |
| JP | 2015-40171 | 3/2015 |
| JP | 2015-074572 | 4/2015 |
| WO | 2013/146378 | 10/2013 |

OTHER PUBLICATIONS

International Search Report issued Sep. 8, 2020 in International (PCT) Application No. PCT/JP2020/025264.
International Preliminary Report on Patentability and Written Opinion of the International Searching Authority issued Jan. 11, 2022 in International (PCT) Application No. PCT/JP2020/025264.

* cited by examiner

*Primary Examiner* — Elizabeth A. Bolden
(74) *Attorney, Agent, or Firm* — Wenderoth, Lind & Ponack, L.L.P.

(57) ABSTRACT

The present invention provides an optical glass that has a high refractive index property and excels in a light transmittance property in the visible range and in resistance to devitrification. The optical glass contains from 3 to 18 mass % of $SiO_2$, from 5 to 11.5 mass % of $B_2O_3$, from 0 to 7 mass % of $Al_2O_3$, from 0 to 11 mass % of CaO, 1 mass % or less of ZnO, from 7 to 20 mass % of $TiO_2$, from 3 to 38 mass % of $Nb_2O_5$, from 27 to 49.8 mass % of $La_2O_3$, from 6 to 14 mass % of $Gd_2O_3$, from 0 to 5 mass % of $Y_2O_3$, less than 6 mass % of $Ta_2O_5$, and 0.6 mass % or less of $WO_3$, with a ratio of $B_2O_3/SiO_2$ being from 1 to 2.

20 Claims, No Drawings

OPTICAL GLASS

TECHNICAL FIELD

The present invention relates to an optical glass used in an optical element such as a lens.

A glass material is used as an optical element such as a lens in a wearable device, such as eyeglasses with a projector, an eyeglasses-type or goggle-type display, a virtual reality or augmented reality display device, and a virtual image display device. The glass material is required to have a high refractive index property from the perspective of achieving a wider angle image, higher levels of brightness and contrast, and improvement in light guiding characteristics, and the like. In addition, compact and wide-angle imaging glass lenses are used in applications such as vehicle-mounted cameras and visual sensors for robots (see, for example, Patent Document 1). Such imaging glass lenses also require a high refractive index property.

CITATION LIST

Patent Literature

Patent Document 1: JP 2015-74572 A

SUMMARY OF INVENTION

Technical Problem

However, typically, when a glass composition is blended for achieving a high refractive index, an element with light absorption in the visible range is often used as a component that increases the refractive index. Therefore, in general, a problem of high refractive index glass is that the light transmittance in the visible range is low. In addition, when a glass composition is blended for achieving a high refractive index, the amount of components constituting the glass skeleton tends to decrease. Therefore, in general, a problem of high refractive index glass is that the glass easily devitrifies and is inferior in terms of mass productivity.

In light of the foregoing, an object of the present invention is to provide an optical glass having a high refractive index property and excelling in a light transmittance property in the visible range and in resistance to devitrification.

Solution to Problem

As a result of diligent research by the present inventors, the present inventors discovered that the problems described above can be solved by inclusion of high refractive index components such as $TiO_2$, $Nb_2O_5$, $La_2O_3$, and $Gd_2O_3$, and strict regulation of the contents of $SiO_2$ and $B_2O_3$ that contribute to vitrification stability.

That is, the optical glass of the present invention contains from 3 to 18 mass % of $SiO_2$, from 5 to 11.5 mass % of $B_2O_3$, from 0 to 7 mass % of $Al_2O_3$, from 0 to 11 mass % of CaO, 1 mass % or less of ZnO, from 7 to 20 mass % of $TiO_2$, from 3 to 38 mass % of $Nb_2O_5$, from 27 to 49.8 mass % of $La_2O_3$, from 6 to 14 mass % of $Gd_2O_3$, from 0 to 5 mass % of $Y_2O_3$, less than 6 mass % of $Ta_2O_5$, and 0.6 mass % or less of $WO_3$, with a ratio of $B_2O_3/SiO_2$ being from 1 to 2.

The optical glass of the present invention preferably contains 36 mass % or greater of $Ln_2O_3$ (where Ln is at least one element selected from La, Gd, Y, and Yb).

The optical glass of the present invention preferably contains 0 mass % or greater but less than 0.2 mass % of BaO.

The optical glass of the present invention preferably has a refractive index (nd) of from 1.84 to 2.04.

The optical glass of the present invention preferably has a liquidus temperature of not higher than 1150° C.

The optical glass of the present invention preferably has a linear transmittance of 72% or greater at a wavelength of 500 nm and a thickness of 5 mm.

An optical element of the present invention includes the optical glass described above.

Advantageous Effects of Invention

According to the present invention, an optical glass having a high refractive index property and excelling in a light transmittance property in the visible range and in resistance to devitrification can be provided.

DESCRIPTION OF EMBODIMENTS

The optical glass according to an embodiment of the present invention contains from 3 to 18 mass % of $SiO_2$, from 5 to 11.5 mass % of $B_2O_3$, from 0 to 7 mass % of $Al_2O_3$, from 0 to 11 mass % of CaO, 1 mass % or less of ZnO, from 7 to 20 mass % of $TiO_2$, from 3 to 38 mass % of $Nb_2O_5$, from 27 to 49.8 mass % of $La_2O_3$, from 6 to 14 mass % of $Gd_2O_3$, from 0 to 5 mass % of $Y_2O_3$, less than 6 mass % of $Ta_2O_5$, and 0.6 mass % or less of $WO_3$, with a ratio of $B_2O_3/SiO_2$ being from 1 to 2. The reason for limiting the glass composition in this manner is described below. Note that, in the description regarding the content of each component below, "%" means "mass %" unless otherwise indicated.

$SiO_2$ is a glass skeletal component that improves vitrification stability and chemical durability. The content of $SiO_2$ is from 3 to 18%, preferably from 3.5 to 15%, more preferably from 4 to 12%, and particularly preferably from 5 to 10%. When the content of $SiO_2$ is too low, the effects described above are not easily achieved. On the other hand, when the content of $SiO_2$ is too high, the refractive index tends to decrease.

$B_2O_3$ is a component that contributes to vitrification stability. The content of $B_2O_3$ is from 5 to 11.5%, preferably from 6.5 to 11.5%, more preferably from 7 to 11%, even more preferably from 8 to 10.5%, and particularly preferably 9% or greater but less than 10.5%. When the content of $B_2O_3$ is too low, the effects described above are not easily achieved. On the other hand, when the content of $B_2O_3$ is too high, the refractive index tends to decrease, and chemical durability tends to decline.

Note that preferably, the proportions of $SiO_2$ and $B_2O_3$ are appropriately adjusted in order to increase vitrification stability and improve mass productivity. Specifically, a mass ratio of $B_2O_3/SiO_2$ is preferably from 1 to 2, more preferably from 1.3 to 1.99, and particularly preferably from 1.5 to 1.98. Note that in the present specification, "X/Y" means a value obtained by dividing the content of X by the content of Y.

$Al_2O_3$ is a component that improves water resistance. However, when the content thereof is too high, the glass tends to easily devitrify. Therefore, the content of $Al_2O_3$ is from 0 to 7%, preferably from 0 to 5%, more preferably from 0 to 2%, and particularly preferably from 0 to 1%.

CaO is a component that readily contributes to particularly vitrification stability, even amongst alkaline earth metal oxides. However, when the content thereof is too high, the refractive index tends to decrease. Therefore, the content of CaO is from 0 to 11%, preferably from 0.1 to 9%, more preferably from 1 to 8%, even more preferably from 2 to 7%, and particularly preferably from 3 to 6%.

ZnO is a component that promotes devitrification in the composition system according to an embodiment of the present invention, and thus the content thereof is preferably low. Specifically, the content of ZnO is 1% or less, preferably 0.5% or less, and even more preferably 0.1% or less, and particularly preferably, ZnO is not contained.

$TiO_2$ is a component that increases the refractive index of glass. $TiO_2$ also has an effect of improving chemical durability. The content of $TiO_2$ is from 7 to 20%, preferably from 8 to 18%, more preferably from 9 to 17%, and particularly preferably from 10 to 16%. When the content of $TiO_2$ is too low, the effects described above are not easily achieved. On the other hand, when the content of $TiO_2$ is too high, the transmittance of the glass in the visible range tends to decrease, and the vitrification stability tends to decline.

$Nb_2O_5$ is a component that increases the refractive index of glass. The content of $Nb_2O_5$ is from 3 to 38%, preferably from 4 to 30%, more preferably from 5 to 19%, even more preferably from 6 to 14%, and particularly preferably from 7 to 10%. When the content of $Nb_2O_5$ is too low, the above effect is not easily achieved. On the other hand, when the content of the $Nb_2O_5$ is too high, the resistance to devitrification declines, and mass productivity tends to decrease. In addition, light transmittance in the visible range tends to decrease.

$La_2O_3$ is a component that increases the refractive index and also improves vitrification stability. The content of $La_2O_3$ is from 27 to 49.8%, preferably from 30 to 49.5%, more preferably from 35 to 49%, and particularly preferably from 38 to 48.5%. When the content of $La_2O_3$ is too low, the effects described above are not easily achieved. On the other hand, when the content of $La_2O_3$ is too high, devitrification easily occurs. Decrease in the resistance to devitrification tends to lead to deterioration in mass productivity.

$Gd_2O_3$ is also a component that increases the refractive index and improves vitrification stability. The content of $Gd_2O_3$ is from 6 to 14%, preferably from 6 to 10%, and particularly preferably from 6 to 9%.

$Y_2O_3$ is a component that improves vitrification stability without reducing the refractive index. However, when the content is too high, devitrification and striae easily occur. Thus, the content of $Y_2O_3$ is from 0 to 5%, preferably from 0.1 to 4%, more preferably from 0.3 to 2%, even more preferably from 0.4 to 1%, and particularly preferably from 0.5 to 0.8%.

$Ta_2O_5$ is a component that increases the refractive index. However, when the content thereof is too high, phase separation and devitrification easily occur. Also, since $Ta_2O_5$ is a rare and expensive component, as the content thereof increases, the batch cost of the raw material also increases. In view of the foregoing, the content of $Ta_2O_5$ is less than 6%, preferably 3% or less, and more preferably 1% or less, and particularly preferably, $Ta_2O_5$ is not contained.

$WO_3$ is a component that increases the refractive index, but tends to reduce light transmittance in the visible range. Therefore, the content thereof is 0.6% or less, preferably 0.5% or less, and more preferably 0.3% or less, and particularly preferably, $WO_3$ is not contained.

The optical glass according to an embodiment of the present invention may contain the following components in addition to the components described above.

$Yb_2O_3$ is a component that increases the refractive index. However, when the content thereof is too high, devitrification and striae easily occur. Thus, the content of $Yb_2O_3$ is from 0 to 10%, and preferably from 0 to 8%.

$ZrO_2$ is a component that increases the refractive index and chemical durability. The content of $ZrO_2$ is from 0 to 10%, preferably from 1 to 9%, more preferably from 3 to 8%, even more preferably from 4 to 7.5%, and particularly preferably from 5 to 7%. When the content of $ZrO_2$ is too high, devitrification easily occurs.

SrO is a component that contributes to vitrification stability. However, when the content thereof is too high, the refractive index tends to decrease. Therefore, the content of SrO is from 0 to 11%, preferably from 0.1 to 9%, and particularly preferably from 1 to 8%.

BaO is a component that contributes to vitrification stability and increases the refractive index. However, when BaO is included, the density of the glass increases, and a weight of an optical element including the optical glass according to an embodiment of the present invention tends to increase. Therefore, inclusion of BaO is not particularly preferable for applications such as wearable devices. Accordingly, the content of BaO is 1% or less, preferably 0.5% or less, and more preferably 0.2% or less, and particularly preferably, BaO is not included.

$Li_2O$, $Na_2O$, and $K_2O$ are components that reduce the softening point, but when the contents thereof are too high, devitrification easily occurs. Therefore, the content of each of these components is from 0 to 3%, and preferably from 0 to 1%, and particularly preferably, these components are not included.

The content of $Ln_2O_3$ is preferably 36% or greater, 40% or greater, or 45% or greater, and particularly preferably 48% or greater. The refractive index and light transmittance in the visible range can be increased by setting the content thereof to such a level. The upper limit of the content of $Ln_2O_3$ is not particularly limited, but when the content is too high, devitrification easily occurs. Therefore, the upper limit is preferably not greater than 70%, or not greater than 65%, and is particularly preferably not greater than 60%. Note that in $Ln_2O_3$, Ln is at least one element selected from La, Gd, Y, and Yb. That is, the content of $Ln_2O_3$ denotes the total amount of $La_2O_3$, $Gd_2O_3$, $Y_2O_3$, and $Yb_2O_3$.

In order to obtain glass having a high refractive index and excelling in vitrification stability in the present invention, preferably, a ratio of the total amount of $SiO_2$ and $B_2O_3$ to the amount of $Ln_2O_3$ is appropriately adjusted. Specifically, the ratio of $(SiO_2+B_2O_3)/Ln_2O_3$ is preferably from 0.15 to 0.9, more preferably from 0.2 to 0.6, and particularly preferably from 0.25 to 0.5. Note that "X+Y+ . . . " herein refers to a total amount of the components.

In the present invention, it is preferable to appropriately adjust proportions of $Nb_2O_5$, $TiO_2$, and $WO_3$ in order to obtain glass that has a high refractive index and excels in transmittance in the visible range. Specifically, a mass ratio of $Nb_2O_5/(Nb_2O_5+TiO_2+WO_3)$ is preferably from 0.15 to 0.8, more preferably from 0.2 to 0.6, and particularly preferably from 0.3 to 0.5.

In order to obtain glass that has a high refractive index and excels in transmittance in the visible range, it is preferable to appropriately adjust a ratio of $TiO_2$ to $Nb_2O_5$. Specifically, the mass ratio of $TiO_2/Nb_2O_5$ is preferably 0.3 or greater, more preferably 0.5 or greater, even more preferably 0.8 or greater, and is particularly preferably 1 or greater. When the mass ratio above is too small, the effects described above are not easily obtained. In addition, vitrification tends to be unstable.

In the present invention, it is preferable to appropriately adjust a total amount of $TiO_2$, $WO_3$, and $Nb_2O_5$ in order to obtain glass excelling in transmittance in the visible range. Specifically, the total amount of $TiO_2+WO_3+Nb_2O_5$ is preferably 45% or less, more preferably 30% or less, even more preferably 27% or less, and particularly preferably 25% or less.

In the present invention, in order to increase the refractive index and light transmittance in the visible range and to improve vitrification stability, preferably, a ratio of $Y_2O_3$ to $Ln_2O_3$ is appropriately adjusted. Specifically, the ratio of $Y_2O_3/Ln_2O_3$ is preferably from 0 to 0.1 or from 0.005 to 0.05, and is particularly preferably from 0.01 to 0.3.

In the present invention, in order to increase the refractive index and light transmittance in the visible range, and to improve vitrification stability, preferably, a ratio of $Gd_2O_3$ to $Ln_2O_3$ is appropriately adjusted. Specifically, the ratio of $Gd_2O_3/Ln_2O_3$ is preferably from 0.1 to 0.25, and particularly preferably from 0.12 to 0.2.

In the present invention, preferably, proportions of $Nb_2O_5$, $TiO_2$, $ZrO_2$, $WO_3$, and $Ln_2O_3$ are appropriately adjusted in order to obtain glass that has a high refractive index and excels in transmittance in the visible range. Specifically, a mass ratio of $Nb_2O_5/(Nb_2O_5+TiO_2+ZrO_2)$ is preferably from 0.1 to 0.46, more preferably from 0.15 to 0.4, and particularly preferably from 0.2 to 0.37.

In the present invention, in order to increase the refractive index and light transmittance in the visible range and to improve vitrification stability, it is preferable to appropriately adjust a ratio of a total amount of $TiO_2$ and $B_2O_3$ to a total amount of $WO_3$ and $Nb_2O_5$. Specifically, the ratio of $(TiO_2+B_2O_3)/(WO_3+Nb_2O_5)$ is preferably from 1.6 to 4, and particularly preferably from 2 to 3.5.

In the present invention, in order to increase vitrification stability, it is preferable to appropriately adjust a ratio of a total amount of CaO, SrO, BaO, and ZnO to a total amount of $Nb_2O_5$, $La_2O_3$, $TiO_2$, and $ZrO_2$. Specifically, the ratio of $(CaO+SrO+BaO+ZnO)/(TiO_2+Nb_2O_5+La_2O_3+ZrO_2)$ is preferably from 0 to 0.6, more preferably from 0.01 to 0.4, and particularly preferably from 0.03 to 0.3.

Note that the environmental load of As components ($As_2O_3$, and the like) and Pb components (PbO, and the like) is large, and thus these components are preferably not included.

The refractive index (nd) of the optical glass according to an embodiment of the present invention is preferably from 1.84 to 2.04, more preferably from 1.88 to 2.01, and particularly preferably from 1.89 to 2.00. In addition, at a wavelength of 500 nm and a thickness of 5 mm, the light transmittance (linear transmittance) in the visible range of the optical glass according to an embodiment of the present invention is preferably 72% or higher, more preferably 74% or higher, and even more preferably 75% or higher. When the optical characteristics described above are satisfied, the optical glass according to an embodiment of the present invention is suitable as an optical element such as an imaging glass lens that is compact and can capture images with a wide range.

Note that an Abbe number (νd) of the optical glass according to an embodiment of the present invention is not particularly limited, but in consideration of vitrification stability, the Abbe number (νd) is preferably not greater than 39, preferably not greater than 35, particularly preferably not greater than 31, and further preferably not greater than 30.

A partial dispersion ratio (θg, F) of the optical glass according to an embodiment of the present invention is preferably 0.615 or less, preferably 0.61 or less, and particularly preferably 0.6 or less. When the partial dispersion ratio is too large, chromatic aberration easily occur.

A liquidus temperature of the optical glass according to an embodiment of the present invention is preferably 1150° C. or lower, preferably 1100° C. or lower, and particularly preferably 1070° C. or lower. When the liquidus temperature is set to such a temperature, mass productivity is readily improved because devitrification does not easily occur during melting or forming.

EXAMPLES

The present invention is described in detail below using examples, but the present invention is not limited to these examples.

Tables 1 and 2 show examples (No. 1 to 10) of the present invention.

TABLE 1

| (mass %) | 1 | 2 | 3 | 4 | 5 | 6 |
|---|---|---|---|---|---|---|
| $SiO_2$ | 5.3 | 7.21 | 9.21 | 5.73 | 5.54 | 5.8 |
| $Al_2O_3$ | | | | | | |
| $B_2O_3$ | 10.0 | 10.26 | 10.26 | 11.29 | 10.9 | 11.4 |
| CaO | | | | 4.11 | | 4.4 |
| SrO | | | | | 7.34 | |
| BaO | | | | | | |
| ZnO | | | | | | |
| $TiO_2$ | 14.49 | 11.93 | 10.0 | 13.12 | 12.68 | 13.25 |
| $Nb_2O_5$ | 8.1 | 8.15 | 7.4 | 8.97 | 8.67 | 7.9 |
| $ZrO_2$ | 5.87 | 5.91 | 5.91 | 6.51 | 6.29 | 6.6 |
| $La_2O_3$ | 47.9 | 48.2 | 48.87 | 41.1 | 39.72 | 41.5 |
| $Gd_2O_3$ | 7.7 | 7.7 | 7.73 | 8.51 | 8.22 | 8.6 |
| $Y_2O_3$ | 0.6 | 0.6 | 0.6 | 0.66 | 0.64 | 0.65 |
| $Yb_2O_3$ | | | | | | |
| $Ta_2O_5$ | | | | | | |
| $WO_3$ | | | | | | |
| $Ln_2O_3$ | 56.2 | 56.5 | 57.2 | 50.3 | 48.6 | 50.8 |
| $B_2O_3/SiO_2$ | 1.89 | 1.42 | 1.11 | 1.97 | 1.97 | 1.97 |
| $(SiO_2 + B_2O_3)/Ln_2O_3$ | 0.27 | 0.31 | 0.34 | 0.34 | 0.34 | 0.34 |
| $Nb_2O_5/(Nb_2O_5 + TiO_2 + ZrO_2)$ | 0.28 | 0.31 | 0.32 | 0.31 | 0.31 | 0.28 |
| $TiO_2/Nb_2O_5$ | 1.79 | 1.46 | 1.35 | 1.46 | 1.46 | 1.68 |

TABLE 1-continued

| (mass %) | 1 | 2 | 3 | 4 | 5 | 6 |
|---|---|---|---|---|---|---|
| $TiO_2 + WO_3 + Nb_2O_5$ | 22.6 | 20.1 | 17.4 | 22.1 | 21.4 | 21.2 |
| $Y_2O_3/Ln_2O_3$ | 0.011 | 0.011 | 0.010 | 0.013 | 0.013 | 0.013 |
| $Gd_2O_3/Ln_2O_3$ | 0.14 | 0.14 | 0.14 | 0.17 | 0.17 | 0.17 |
| $Nb_2O_5/(Nb_2O_5 + TiO_2 + WO_3)$ | 0.36 | 0.41 | 0.43 | 0.41 | 0.41 | 0.37 |
| $(TiO_2 + B_2O_3)/(WO_3 + Nb_2O_5)$ | 3.02 | 2.72 | 2.74 | 2.72 | 2.72 | 3.12 |
| $(CaO + SrO + BaO + ZnO)/(TiO_2 + Nb_2O_5 + La_2O_3 + ZrO_2)$ | 0.00 | 0.00 | 0.00 | 0.06 | 0.11 | 0.06 |
| Refractive index nd | 1.977 | 1.952 | 1.912 | 1.945 | 1.940 | 1.935 |
| Abbe number νd | 28.4 | 30.7 | 31.2 | 29.9 | 30.0 | 29.9 |
| Partial dispersion ratio θ g, F | 0.601 | 0.595 | 0.610 | 0.598 | 0.598 | 0.597 |
| Liquidus temperature (° C.) | 1120 | 1100 | 1140 | 1050 | 1090 | 1060 |
| Linear transmittance (%) | 76 | 77 | 78 | 77 | 77 | 77 |

TABLE 2

| (mass %) | 7 | 8 | 9 | 10 |
|---|---|---|---|---|
| $SiO_2$ | 6.5 | 6.5 | 6.3 | 5.55 |
| $Al_2O_3$ | | | | |
| $B_2O_3$ | 8.26 | 9.42 | 7.1 | 8.09 |
| CaO | | | | |
| SrO | | | | |
| BaO | | | | |
| ZnO | | | | |
| $TiO_2$ | 14.43 | 14.91 | 13.4 | 14.13 |
| $Nb_2O_5$ | 7.36 | 5.75 | 7.1 | 7.21 |
| $ZrO_2$ | 5.85 | 5.92 | 5.6 | 5.73 |
| $La_2O_3$ | 47.7 | 48.47 | 48.1 | 46.9 |
| $Gd_2O_3$ | 7.7 | 7.35 | 7.4 | 7.4 |
| $Y_2O_3$ | 2.2 | 1.7 | 5.0 | 5.0 |
| $Yb_2O_3$ | | | | |
| $Ta_2O_5$ | | | | |
| $WO_3$ | | | | |
| $Ln_2O_3$ | 57.6 | 57.5 | 60.5 | 59.3 |
| $B_2O_3/SiO_2$ | 1.27 | 1.45 | 1.13 | 1.46 |
| $(SiO_2 + B_2O_3)/Ln_2O_3$ | 0.26 | 0.28 | 0.22 | 0.23 |
| $Nb_2O_5/(Nb_2O_5 + TiO_2 + ZrO_2)$ | 0.27 | 0.22 | 0.27 | 0.27 |
| $TiO_2/Nb_2O_5$ | 1.96 | 2.59 | 1.89 | 1.96 |
| $TiO_2 + WO_3 + Nb_2O_5$ | 21.8 | 20.7 | 20.5 | 21.3 |
| $Y_2O_3/Ln_2O_3$ | 0.038 | 0.030 | 0.083 | 0.084 |
| $Gd_2O_3/Ln_2O_3$ | 0.13 | 0.13 | 0.12 | 0.12 |
| $Nb_2O_5/(Nb_2O_5 + TiO_2 + WO_3)$ | 0.34 | 0.28 | 0.35 | 0.34 |
| $(TiO_2 + B_2O_3)/(WO_3 + Nb_2O_5)$ | 3.08 | 4.23 | 2.89 | 3.08 |
| $(CaO + SrO + BaO + ZnO)/(TiO_2 + Nb_2O_5 + La_2O_3 + ZrO_2)$ | 0.00 | 0.00 | 0.00 | 0.00 |
| Refractive index nd | 1.998 | 1.985 | 2.000 | 2.004 |
| Abbe number νd | 29.0 | 29.4 | 29.0 | 28.9 |
| Partial dispersion ratio θg, F | — | — | — | 0.600 |
| Liquidus temperature (° C.) | 1130 | 1150 | 1150 | 1150 |
| Linear transmittance (%) | 78 | 73 | 73 | 77 |

First, glass raw materials were blended to prepare each of the compositions shown in Tables 1 and 2, and were melted at a temperature from 1200 to 1350° C. for 2 hours using a platinum crucible. The molten glass was poured onto a carbon plate and annealed by maintaining it at 700 to 800° C. for 2 to 72 hours, and thereby samples suitable for each measurement were produced.

The refractive index (nd), Abbe number (νd), light transmittance, and liquidus temperature were measured for the produced samples. The results are shown in Tables 1 and 2.

The refractive index was presented as a measured value for a d-line (587.6 nm) of a helium lamp.

The Abbe number was calculated from the equation of Abbe number (νd)=[(nd−1)/(nF−nC)] using the above-mentioned refractive index for d-line, a refractive index value for an F-line (486.1 nm) of a hydrogen lamp, and a refractive index value for a C-line (656.3 nm) of the hydrogen lamp.

The liquidus temperature was measured by remelting the glass in an electric furnace at 1200° C. for 0.5 hours, holding the material for 18 hours in an electric furnace having a temperature gradient. And then the material was removed from the electric furnace, and cooled in air. The glass was observed using an optical microscope and a precipitation position of a devitrified substance was thus determined.

The linear transmittance was measured as follows. The linear transmittance including surface reflection loss of an optically polished sample having a thickness of 5 mm±0.1 mm was measured at 0.5 nm intervals using a spectrophotometer (UV-3100, available from Shimadzu Corporation). The linear transmittance at a wavelength of 500 nm was read from a light transmittance curve obtained through the measurements.

As shown in Tables 1 and 2, the samples of Examples No. 1 to 10 exhibited the desired optical characteristics, had a low liquidus temperature of 1150° C. or lower, and excelled in resistance to devitrification. In addition, the linear transmittance at a wavelength of 500 nm was 73% or higher, which was excellent.

The invention claimed is:

1. An optical glass comprising from 3 to 11.5 mass % of $SiO_2$, from 5 to 11.5 mass % of $B_2O_3$, from 0 to 7 mass % of $Al_2O_3$, from 0 to 11 mass % of CaO, 0.1 mass % or less of ZnO, from 10 to 16 mass % of $TiO_2$, from 3 to 38 mass % of $Nb_2O_5$, from 27 to 49.8 mass % of $La_2O_3$, from 6 to 14 mass % of $Gd_2O_3$, from 0 to 5 mass % of $Y_2O_3$, less than 6 mass % of $Ta_2O_5$, and 0.6 mass % or less of $WO_3$, with a ratio of $B_2O_3/SiO_2$ being from 1 to 2.

2. The optical glass according to claim 1, further comprising 36 mass % or greater of $Ln_2O_3$, where Ln is at least one element selected from La, Gd, Y, and Yb.

3. The optical glass according to claim 1, further comprising 0 mass % or greater but less than 0.2 mass % of BaO.

4. The optical glass according to claim 1, wherein a refractive index (nd) is from 1.84 to 2.04.

5. The optical glass according to claim 1, wherein a liquidus temperature is not higher than 1150° C.

6. The optical glass according to claim 1, wherein a linear transmittance at a wavelength of 500 nm and a thickness of 5 mm is 72% or greater.

7. An optical element comprising the optical glass described in claim 1.

8. The optical glass according to claim 2, further comprising 0 mass % or greater but less than 0.2 mass % of BaO.

9. The optical glass according to claim 2, wherein a refractive index (nd) is from 1.84 to 2.04.

10. The optical glass according to claim 3, wherein a refractive index (nd) is from 1.84 to 2.04.

11. The optical glass according to claim 8, wherein a refractive index (nd) is from 1.84 to 2.04.

12. The optical glass according to claim 2, wherein a liquidus temperature is not higher than 1150° C.

13. The optical glass according to claim 3, wherein a liquidus temperature is not higher than 1150° C.

14. The optical glass according to claim 4, wherein a liquidus temperature is not higher than 1150° C.

15. The optical glass according to claim 8, wherein a liquidus temperature is not higher than 1150° C.

16. The optical glass according to claim 9, wherein a liquidus temperature is not higher than 1150° C.

17. The optical glass according to claim 10, wherein a liquidus temperature is not higher than 1150° C.

18. The optical glass according to claim 11, wherein a liquidus temperature is not higher than 1150° C.

19. The optical glass according to claim 2, wherein a linear transmittance at a wavelength of 500 nm and a thickness of 5 mm is 72% or greater.

20. The optical glass according to claim 3, wherein a linear transmittance at a wavelength of 500 nm and a thickness of 5 mm is 72% or greater.

* * * * *